US009119282B2

(12) United States Patent
Yamazawa

(10) Patent No.: US 9,119,282 B2
(45) Date of Patent: Aug. 25, 2015

(54) PLASMA PROCESSING APPARATUS AND PLASMA PROCESSING METHOD

(75) Inventor: Yohei Yamazawa, Nirasaki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 668 days.

(21) Appl. No.: 13/410,487

(22) Filed: Mar. 2, 2012

(65) Prior Publication Data

US 2012/0223060 A1 Sep. 6, 2012

Related U.S. Application Data

(60) Provisional application No. 61/466,128, filed on Mar. 22, 2011.

(30) Foreign Application Priority Data

Mar. 3, 2011 (JP) ................................ 2011-046268

(51) Int. Cl.
*B23K 10/00* (2006.01)
*H05H 1/46* (2006.01)

(52) U.S. Cl.
CPC ......... *H05H 1/46* (2013.01); *H05H 2001/4667* (2013.01); *H05H 2001/4682* (2013.01)

(58) Field of Classification Search
CPC ............ H05H 1/42; H05H 2001/4667; H05H 2001/4682; H01J 37/3211; H01J 37/32091; H01J 37/32082; H01L 21/67069; H01L 21/3065
USPC ............... 219/121.43, 121.48, 121.4, 121.41; 315/111.51; 118/723 R, 723 I; 156/345.48, 345.44; 438/711, 710
See application file for complete search history.

(56) References Cited

U.S. PATENT DOCUMENTS

| | | | | | |
|---|---|---|---|---|---|
| 5,122,251 | A | * | 6/1992 | Campbell et al. | 204/298.06 |
| 5,800,619 | A | | 9/1998 | Holland et al. | |
| 6,005,218 | A | * | 12/1999 | Walde et al. | 219/121.54 |

(Continued)

FOREIGN PATENT DOCUMENTS

| | | | |
|---|---|---|---|
| JP | 2001-085196 | A | 3/2001 |
| JP | 2010-135298 | A | 6/2010 |
| WO | 02/080221 | A1 | 10/2002 |

*Primary Examiner* — Mark Paschall
(74) *Attorney, Agent, or Firm* — Pearne & Gordon LLP

(57) ABSTRACT

In an inductively coupled plasma processing apparatus, an RF antenna 54 provided on a dielectric window 52 is split into an inner coil 58, an intermediate coil 60, and an outer coil 62 in a radial direction. When traveling along each of the coils from a high frequency power supply 72 to a ground potential member via a RF power supply line 68, the RF antenna 54, and an earth line 70, a direction passing through the inner coil 58 and the outer coil 62 is a counterclockwise direction, whereas a direction passing through the intermediate coil 60 is a clockwise direction. Further, a variable intermediate capacitor 86 and a variable outer capacitor 88 are electrically connected in series with the intermediate coil 60 and the outer coil 62, respectively, between the first and second nodes $N_A$ and $N_B$.

23 Claims, 10 Drawing Sheets

(56) References Cited

U.S. PATENT DOCUMENTS

| | | | | |
|---|---|---|---|---|
| 6,136,139 | A * | 10/2000 | Ishii et al. | 156/345.48 |
| 6,164,241 | A | 12/2000 | Chen et al. | |
| 6,300,227 | B1 * | 10/2001 | Liu et al. | 438/513 |
| 6,409,933 | B1 * | 6/2002 | Holland et al. | 216/68 |
| 8,662,010 | B2 * | 3/2014 | Matsuda et al. | 118/723 I |
| 2001/0052394 | A1 | 12/2001 | Jung | |
| 2003/0111181 | A1 * | 6/2003 | Wang et al. | 156/345.48 |
| 2004/0255864 | A1 | 12/2004 | Jeon | |
| 2005/0109462 | A1 * | 5/2005 | Lee et al. | 156/345.48 |
| 2007/0221331 | A1 * | 9/2007 | Lee | 156/345.38 |
| 2010/0243162 | A1 * | 9/2010 | Koshimizu | 156/345.28 |
| 2011/0117742 | A1 * | 5/2011 | Morikawa et al. | 438/696 |

* cited by examiner

CURRENT DENSITY DISTRIBUTION WITHIN DONUT-SHAPED PLASMA

PLASMA PROCESSING APPARATUS AND PLASMA PROCESSING METHOD

CROSS-REFERENCE TO RELATED APPLICATION

This application claims the benefit of Japanese Patent Application No. 2011-046268 filed on Mar. 3, 2011 and U.S. Provisional Application No. 61/466,128 filed on Mar. 22, 2011, the entire disclosures of which are incorporated herein by reference.

FIELD OF THE INVENTION

The present disclosure relates to a technique for performing a plasma process on a processing target substrate; and, more particularly, to an inductively coupled plasma processing apparatus and a plasma processing method.

BACKGROUND OF THE INVENTION

In a manufacturing process of a semiconductor device or a FPD (Flat Panel Display), plasma is used to perform a process, such as etching, deposition, oxidation, or sputtering, to perform a good reaction of a processing gas at a relatively low temperature. Conventionally, plasma generated by a high frequency electric discharge in MHz frequency band has been used in this kind of plasma process. The plasma generated by the high frequency electric discharge is largely divided into capacitively coupled plasma and inductively coupled plasma according to a plasma generation method (in view of an apparatus).

Generally, in an inductively coupled plasma processing apparatus, at least a part (for example, a ceiling) of walls of a processing chamber may have a dielectric window, and a high frequency power is supplied to a coil-shaped RF antenna positioned at an outside of this dielectric window. The processing chamber is a depressurizable vacuum chamber, and a processing target substrate (for example, a semiconductor wafer or a glass substrate) is provided at a central region within the chamber. A processing gas is supplied into a processing space formed between the dielectric window and the substrate. A high frequency AC magnetic field having magnetic force lines is generated around the RF antenna by a high frequency current flowing in the RF antenna. The magnetic force lines of the high frequency AC magnetic field are transmitted to the processing space within the chamber via the dielectric window. As the RF magnetic field of the high frequency AC magnetic field changes with time, an inductive electric field is generated in an azimuth direction within the processing space. Then, electrons accelerated by this inductive electric field in the azimuth direction collide with molecules or atoms of the processing gas to be ionized. In this process, donut-shaped plasma may be generated.

Since a large processing space is formed within the chamber, the donut-shaped plasma can be diffused efficiently in all directions (especially, in a radial direction) and a plasma density on the substrate becomes very uniform. However, only with a conventional RF antenna, the plasma density on a substrate is not sufficiently uniform for most plasma processes. In the plasma process, it is also one of the important issues to improve uniformity or controllability of a plasma density on a substrate since a uniformity/reproducibility and a production yield of a plasma process depend on the plasma uniformity or controllability.

In the inductively coupled plasma processing apparatus, a characteristic (profile) of a plasma density distribution within the donut-shaped plasma formed in the vicinity of the dielectric window within the chamber is important. Especially, the profile of the plasma density distribution affects characteristics (especially, uniformity) of a plasma density distribution on the substrate after the diffusion of the plasma.

In this regard, there have been proposed several methods for improving uniformity of a plasma density distribution in a diametrical direction by dividing the RF antennal into a multiple number of circular ring-shaped coils having different diameters. There are two types of RF antenna division methods: a first type of connecting the multiple number of circular ring-shaped coils in series (see, for example, Patent Document 1) and a second type of connecting the multiple number of circular ring-shaped coils in parallel (see, for example, Patent Document 2).

Patent Document 1: U.S. Pat. No. 5,800,619

Patent Document 2: U.S. Pat. No. 6,164,241

In accordance with the first type method among the aforementioned conventional RF antenna division methods, since an entire coil length of the RF antenna is large as a sum of all the coils, a voltage drop within the RF antenna may be fairly large and not negligible. Further, due to a wavelength effect, a standing wave of electric current having a node in the vicinity of a RF input terminal of the RF antenna may be easily formed. For these reasons, in accordance with this first type method, it may be difficult to achieve uniformity of a plasma density distribution in a diametrical direction as well as in a circumferential direction. Thus, the first type method is essentially deemed to be inadequate for a plasma process for which plasma of a large diameter is necessary.

Meanwhile, in accordance with the second type method, the RF currents supplied to the RF antenna from a high frequency power supply flows through an inner coil having a small coil diameter (i.e., smaller impedance) in a relatively large amount, whereas a relatively small amount of RF current flows through an outer coil having a large diameter (i.e., larger impedance). Accordingly, a plasma density within the chamber may be high at a central portion of the chamber in the diametrical direction while the plasma density may be low at a periphery portion thereof. Thus, in the second type method, variable capacitors for adjusting impedance are additionally added (connected) to respective coils within the RF antenna to adjust a ratio of the RF currents flowing through the respective coils. However, there is a limit in a variable range of the RF current ratio. Accordingly, it has been difficult to precisely control a plasma density distribution in the vicinity of a substrate held on a substrate holding unit.

BRIEF SUMMARY OF THE INVENTION

In view of the foregoing problems, illustrative embodiments provide a plasma processing method and an inductively coupled plasma processing apparatus capable of precisely controlling a plasma density distribution within donut-shaped plasma and, thus, capable of precisely controlling a plasma density distribution in the vicinity of a substrate on a substrate holding unit.

In accordance with one aspect of an illustrative embodiment, there is provided a plasma processing apparatus. The plasma processing apparatus includes a processing chamber having a dielectric window; a substrate holding unit for holding thereon a processing target substrate within the processing chamber; a processing gas supply unit configured to supply a processing gas into the processing chamber in order to perform a plasma process on the processing target substrate; an RE antenna provided outside the dielectric window and configured to generate plasma of the processing gas within the processing chamber by inductive coupling; and a high frequency power supply unit configured to supply a high frequency power having a frequency for generating a high frequency electric discharge of the processing gas to the RF antenna. The RF antenna may include an inner coil and an outer coil with a gap therebetween in a radial direction, and the inner coil and the outer coil may be electrically connected in parallel to each other between a first node and a second node on high frequency transmission lines of the high frequency power supply unit. Further, when traveling along each of the inner coil and the outer coil from the first node to the second node via the high frequency transmission lines, a direction passing through the inner coil and a direction passing through the outer coil may be opposite to each other in a circumferential direction. Furthermore, a first capacitor electrically connected in series with one coil of the inner coil and the outer coil may be provided between the first node and the second node.

In the plasma processing apparatus in accordance with the illustrative embodiment, when the high frequency power is supplied from the high frequency power supply unit to the RF antenna, an RF magnetic field is formed around each of the inner coil and the outer coil of the RF antenna by high frequency currents flowing in the respective coils, i.e., the inner coil and the outer coil. Further, an inductive electric field configured to generate high frequency electric discharge of the processing gas, i.e., donut-shaped plasma in the processing chamber is formed. In the plasma processing apparatus, the inner coil and the outer coil are connected in opposite directions to each other with respect to the high frequency power supply unit. Further, by adjusting a combined impedance of the first capacitor and a coil electrically connected in series with the first capacitor, especially a reactance, directions and amounts of the currents flowing in the inner and outer coils can be controlled, and a plasma density distribution within donut-shaped plasma can also be controlled. Especially, it is possible to control the direction of the current flowing in the coil electrically connected in series with the first capacitor to be identical to the direction of the current flowing in the other coil. Further, it is possible to control the amount of the current flowing in the coil electrically connected in series with the first capacitor to be a sufficiently small. Accordingly, a plasma density distribution within donut-shaped plasma and a plasma density distribution on the substrate can be controlled precisely.

In accordance with another aspect of an illustrative embodiment, there is provided a plasma processing apparatus. The plasma processing apparatus includes a processing chamber having a dielectric window; a substrate holding unit for holding thereon a processing target substrate within the processing chamber; a processing gas supply unit configured to supply a processing gas into the processing chamber in order to perform a plasma process on the processing target substrate; an RF antenna provided outside the dielectric window and configured to generate plasma of the processing gas within the processing chamber by inductive coupling; and a high frequency power supply unit configured to supply a high frequency power having a frequency for generating a high frequency electric discharge of the processing gas to the RF antenna. The RF antenna may include an inner coil, an intermediate coil, and an outer coil with gaps therebetween in a radial direction, and the inner coil, the intermediate coil, and the outer coil may be electrically connected in parallel with one another between a first node and a second node on high frequency transmission lines of the high frequency power supply unit. Further, when traveling along each of the inner coil, the intermediate coil, and the outer coil from the first node to the second node via the high frequency transmission lines, a direction passing through the intermediate coil may be opposite to directions passing through the inner coil and the outer coil in a circumferential direction. Furthermore, a first capacitor electrically connected in series with the intermediate coil may be provided between the first node and the second node.

In accordance with still another aspect of the illustrative embodiment, there is provided a plasma processing method for performing a plasma process on a processing target substrate by using a plasma processing apparatus. The plasma processing apparatus includes a processing chamber having a dielectric window; a substrate holding unit for holding thereon a processing target substrate within the processing chamber; a processing gas supply unit configured to supply a processing gas into the processing chamber in order to perform a plasma process on the processing target substrate; an RF antenna provided outside the dielectric window and configured to generate plasma of the processing gas within the processing chamber by inductive coupling; and a high frequency power supply unit configured to supply a high frequency power having a frequency for generating a high frequency electric discharge of the processing gas to the RF antenna. Further, the plasma processing method includes splitting the RF antenna into an inner coil, an intermediate coil, and an outer coil with gaps therebetween in a radial direction, and electrically connecting the inner coil, the intermediate coil, and the outer coil in parallel with one another between a first node and a second node on high frequency transmission lines of the high frequency power supply unit; connecting each of the inner coil, the intermediate coil, and the outer coil such that a direction passing through the intermediate coil is opposite to directions passing through the inner coil and the outer coil in a circumferential direction when traveling along the inner coil, the intermediate coil, and the outer coil from the first node to the second node via the high frequency transmission lines; providing a first variable capacitor electrically connected in series with the intermediate coil between the first node and the second node; and controlling a plasma density distribution on the processing target substrate by setting or varying an electrostatic capacitance of the first variable capacitor.

In the plasma processing apparatus or the plasma processing method, when the high frequency power is supplied from the high frequency power supply unit to the RF antenna, an RF magnetic field is formed around each of the inner coil, the intermediate coil, and the outer coil of the RF antenna by high frequency currents flowing in the respective coils, i.e., inner coil, intermediate coil, and outer coil. Further, an inductive electric field configured to generate high frequency electric discharge of the processing gas, i.e., donut-shaped plasma in the processing chamber is formed. In the plasma processing apparatus, each of the inner coil and the outer coil is connected in a forward direction with respect to the high frequency power supply unit, the intermediate coil is connected in a backward direction. Further, by adjusting a combined impedance of the intermediate coil and the first capacitor, especially a reactance, a direction and an amount of the current flowing in the intermediate coil can be controlled, and a plasma density distribution within donut-shaped plasma can also be controlled variously and precisely. Especially, it is possible to control the direction of the current flowing in the intermediate coil to be identical to directions of currents flowing in the inner coil and the outer coil in the circumferential direction. Further, it is also possible to control the amount of the current flowing in the intermediate coil to be a sufficiently small. Accordingly, a plasma density distribution within donut-shaped plasma and a plasma density distribution on the substrate can be controlled variously and precisely.

In accordance with the plasma processing apparatus or the plasma processing method of the illustrative embodiments, it is possible to precisely control the plasma density distribution within the donut-shaped plasma and the plasma density distribution on the substrate in various ways, with the above-described configuration and operation.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Hereinafter, illustrative embodiments will be described with reference to the accompanying drawings.

[Overall Configuration and Operation of Apparatus]

Figure 1:
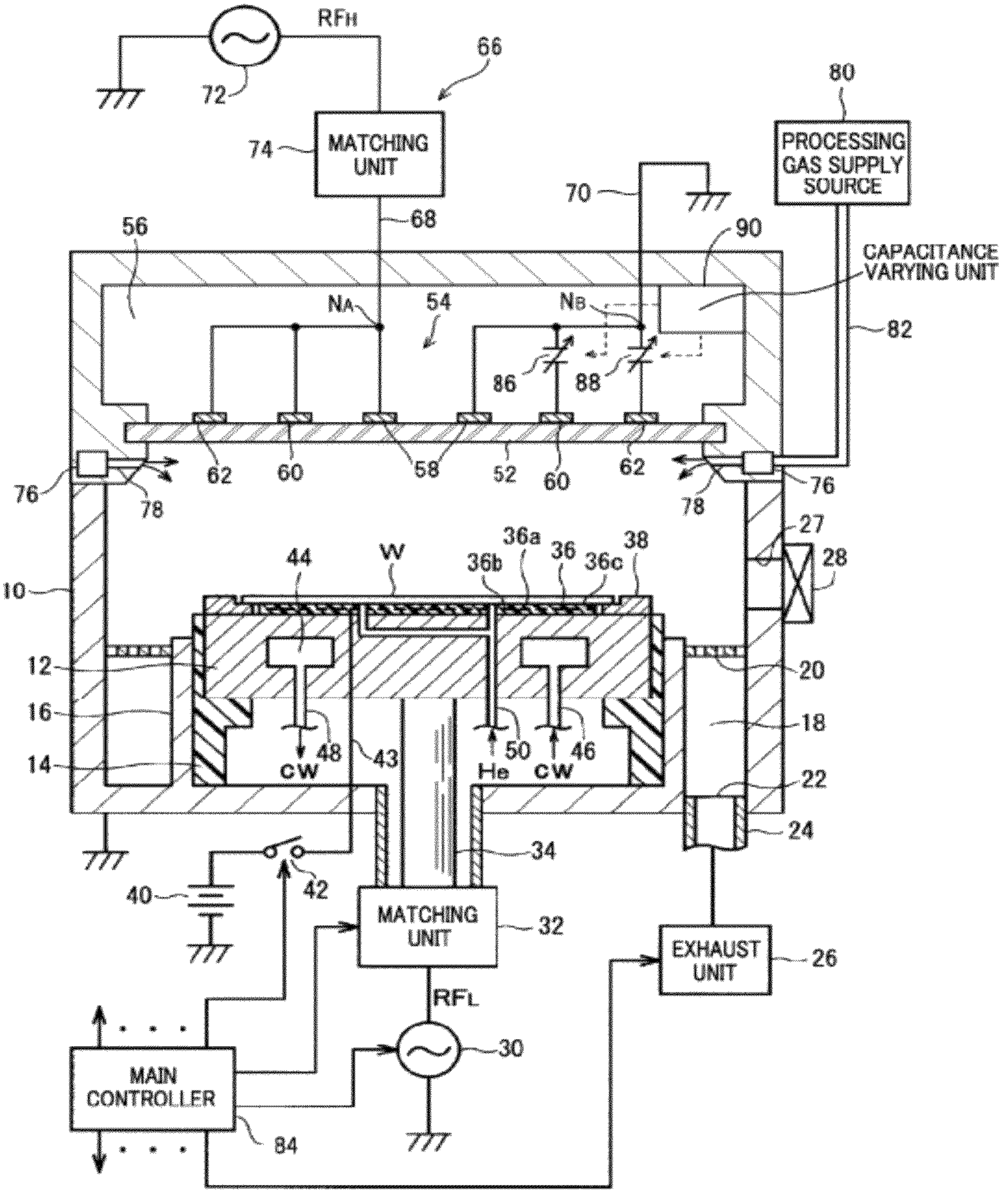
FIG. 1 is a cross sectional view showing a configuration of an inductively coupled plasma processing apparatus in accordance with a first illustrative embodiment.

FIG. 1 illustrates a configuration of an inductively coupled plasma processing apparatus in accordance with a first illustrative embodiment.

The plasma processing apparatus is configured as an inductively coupled plasma etching apparatus using a planar coil RF antenna. By way of example, the plasma etching apparatus may include a cylindrical vacuum chamber (processing chamber) 10 made of metal such as aluminum or stainless steel. The chamber 10 may be frame grounded.

Above all, there will be explained a configuration of each component which is not related to plasma generation in this inductively coupled plasma etching apparatus.

At a lower central region within the chamber 10, a circular plate-shaped susceptor 12 may be provided horizontally. The susceptor 12 may mount thereon a processing target substrate such as a semiconductor wafer W and may serve as a high frequency electrode as well as a substrate holder. This susceptor 12 may be made of, for example, aluminum and may be supported by a cylindrical insulating support 14 which may be extended uprightly from a bottom of the chamber 10.

Between a cylindrical conductive support 16 which is extended uprightly from a bottom of the chamber 10 along the periphery of the cylindrical insulating support 14 and an inner wall of the chamber 10, an annular exhaust line 18 may be provided. Further, an annular baffle plate 20 may be provided at an upper portion or an input of the exhaust line 18. Further, an exhaust port 22 may be provided at a bottom portion. In order for a gas flow within the chamber 10 to be uniformized with respect to an axis of the semiconductor wafer W on the susceptor 12, multiple exhaust ports 22 equi-spaced from each other along a circumference may be provided. Each exhaust port 22 may be connected to an exhaust unit 26 via an exhaust pipe 24. The exhaust unit 26 may include a vacuum pump such as a turbo molecular pump or the like. Thus, it may be possible to depressurize a plasma generation space within the chamber 10 to a required vacuum level. At an outside of a sidewall of the chamber 10, a gate valve 28 configured to open and close a loading/unloading port 27 of the semiconductor wafer W may be provided.

The susceptor 12 may be electrically connected to a high frequency power supply 30 for RF bias via a matching unit 32 and a power supply rod 34. This high frequency power supply 30 may be configured to output a variable high frequency power $RF_L$ having an appropriate frequency (typically, about 13.56 MHz or less) to control energies of ions attracted into the semiconductor wafer W. The matching unit 32 may accommodate a variable reactance matching circuit for performing matching between impedance on the side of the high frequency power supply 30 and impedance on a load side (mainly, susceptor, plasma, and chamber). The matching circuit may include a blocking capacitor configured to generate a self-bias.

An electrostatic chuck 36 for holding the semiconductor wafer W by an electrostatic attraction force may be provided on an upper surface of the susceptor 12. Further, a focus ring 38 may be provided around the electrostatic chuck 36 to annularly surround the periphery of the semiconductor wafer W. The electrostatic chuck 36 may be formed by placing an electrode 36*a* made of a conductive film between a pair of insulating films 36*b* and 36*c*. A high voltage DC power supply 40 may be electrically connected to the electrode 36*a* via a switch 42 and a coated line 43. By applying a high DC voltage from the high voltage DC power supply 40, the semiconductor wafer W can be attracted to and held on the electrostatic chuck 36 by the electrostatic force.

A coolant cavity or a coolant path 44 extended, e.g., in a circumferential direction, may be formed within the susceptor 12. A coolant, such as cooling water cw, having a certain temperature may be supplied into and circulated through the coolant path 44 from a chiller unit (not illustrated) via lines 46 and 48. By adjusting the temperature of the cooling water cw, it may be possible to control a process temperature of the semiconductor wafer W held on the electrostatic chuck 36. Further, a heat transfer gas, such as a He gas, may be supplied from a heat transfer gas supply unit (not illustrated) into a space between an upper surface of the electrostatic chuck 36 and a rear surface of the semiconductor wafer W through a gas supply line 50. Furthermore, an elevating device (not shown) including lift pins configured to move up and down vertically through the susceptor 12 may be provided to load and unload the semiconductor wafer W.

Hereinafter, there will be explained a configuration of each component which is related to plasma generation in this inductively coupled plasma etching apparatus.

A ceiling or a ceiling plate of the chamber 10 may be separated relatively far from the susceptor 12. A circular dielectric window 52 formed of, for example, a quartz plate may be airtightly provided as the ceiling plate. Above the dielectric window 52, an antenna chamber 56 may be provided as a part of the chamber 10. The antenna chamber 56 may accommodate therein a RF antenna 54 and shield this RF antenna 54 from the outside.

The RF antenna 54 is provided in parallel to the dielectric window 52. Desirably, the RF antenna 54 may be placed on the top surface of the dielectric window 52 and include an inner coil 58, an intermediate coil 60, and an outer coil 62 with a certain gap therebetween in a radial direction. The coils 58, 60, and 62 are coaxially (desirably, concentrically) arranged. Further, the coils 58, 60, and 62 are also arranged concentrically with the chamber 10 or the susceptor 12.

In the illustrative embodiment, the term “coaxial” means that central axes of multiple objects having axisymmetric shapes are aligned with each other. As for multiple coils, respective coils surfaces may be offset with each other in an axial direction or may be aligned on the same plane (positioned concentrically).

Further, the inner coil 58, the intermediate coil 60, and the outer coil 62 are electrically connected in parallel between a high frequency power supply line 68 from a high frequency power supply unit 66 for plasma generation and a return line 70 toward a ground potential member (i.e., between two nodes $N_A$ and $N_B$). Here, the return line 70 as an earth line is grounded and is connected with a ground potential member (for example, the chamber 10 or other member) that is electrically maintained at a ground potential.

A variable capacitor 86 is provided between the node $N_B$ on the earth line 70 and the intermediate coil 60. Further, a variable capacitor 88 is provided between the node $N_B$ on the earth line 70 and the outer coil 62. Capacitances of these variable capacitors 86 and 88 may be independently adjusted to a desired value within a certain range by a capacitance varying unit 90 under the control of a main controller 84. Hereinafter, a capacitor connected in series to the inner coil 58 will be referred to as an “inner capacitor”; a capacitor connected in series to the intermediate coil 60 will be referred to as an “intermediate coil”; and a capacitor connected in series to the outer coil 62 will be referred to as an “outer capacitor.”

The high frequency power supply unit 66 may include a high frequency power supply 72 and a matching unit 74. The high frequency power supply 72 is capable of outputting a variable high frequency power $RF_H$ having a frequency (typically, equal to or higher than about 13.56 MHz) for generating plasma by an inductively coupled high frequency electric discharge. The matching unit 74 has a reactance-variable matching circuit for performing matching between impedance on the side of the high frequency power supply 72 and impedance on the side of a load (mainly, RF antenna or plasma).

A processing gas supply unit for supplying a processing gas into the chamber 10 may include an annular manifold or buffer unit 76; multiple sidewall gas discharge holes 78; and a gas supply line 82. The processing gas supply source 80 may include a flow rate controller and an opening/closing valve (not shown).

The main controller 84 may include, for example, a micro computer and may control an operation of each component within this plasma etching apparatus, for example, the exhaust unit 26, the high frequency power supplies 30 and 72, the matching units 32 and 74, the switch 42 for the electrostatic chuck, the variable capacitors 86 and 88, the processing gas supply source 80, the chiller unit (not shown), and the heat transfer gas supply unit (not shown) as well as the whole operation (sequence) of the apparatus.

In order to perform an etching process in this inductively coupled plasma etching apparatus, when the gate valve 28 becomes open, the semiconductor wafer W as a process target may be loaded into the chamber 10 and mounted on the electrostatic chuck 36. Then, after closing the gate valve 28, an etching gas (generally, an mixture gas) may be introduced into the chamber 10 from the processing gas supply source 80 via the gas supply line 82, the buffer unit 76, and the sidewall gas discharge holes 78 at a certain flow rate and a flow rate ratio. Subsequently, the internal pressure of the chamber 10 may be controlled to be a certain level by the exhaust unit 26. Further, the high frequency power supply 72 of the high frequency power supply unit 66 is turned on, and the high frequency power $RF_H$ for plasma generation is outputted at a certain RF power level. A current of the high frequency power $RF_H$ is supplied to the inner coil 58, the intermediate coil 60 and the outer coil 62 of the RF antenna 54 through the matching unit 74, the RF power supply line 68, and the return line 70. Meanwhile, the high frequency power supply 30 may be turned on to output the high frequency power $RF_L$ for ion attraction control at a certain RF power level. This high frequency power $RF_L$ may be applied to the susceptor 12 via the matching unit 32 and the power supply rod 34. Further, a heat transfer gas (a He gas) may be supplied to a contact interface between the electrostatic chuck 36 and the semiconductor wafer W from the heat transfer gas supply unit. Furthermore, the switch 42 is turned on, and then, the heat transfer gas may be confined in the contact interface by the electrostatic force of the electrostatic chuck 36.

Within the chamber 10, an etching gas discharged from sidewall gas discharge holes 78 is diffused into a processing space below the dielectric window 52. By the current of the high frequency power $RF_H$ flowing in the coils 58, 60, and 62, magnetic force lines (magnetic flux) generated around these coils are transmitted to the processing space (plasma generation space) within the chamber 10 via the dielectric window 52. An induced electric field may be generated in an azimuth direction within the processing space. Then, electrons accelerated by this induced electric field in the azimuth direction may collide with molecules or atoms of the etching gas to be ionized. In the process, donut-shaped plasma may be generated.

Radicals or ions in the donut-shaped plasma may be diffused in all directions within the large processing space. To be specific, while the radicals are isotropically introduced and the ions are attracted by a DC bias, the radicals and the ions may be supplied on an upper surface (target surface) of the semiconductor wafer W. Accordingly, plasma active species may perform chemical and physical reactions on the target surface of the semiconductor wafer W to etch a target film into a required pattern.

Herein, “donut-shaped plasma” is not limited to only ring-shaped plasma which is generated only at the radially peripheral portion in the chamber 10 without being generated at the radially inner portion (at a central region) therein. Further, “donut-shaped plasma” may include a state where a plasma volume or a plasma density at the radially peripheral portion is greater than that at the radially inner portion. Further, depending on a kind of a gas used for the processing gas, an internal pressure of the chamber 10, or the like, the plasma may have other shapes instead of “the donut shape”.

In this inductively coupled plasma etching apparatus, the inner coil 58, the intermediate coil 60, and the outer coil 62 are configured to have specific electric connection to be described below. Further, by adding the capacitors (variable capacitors 86 and 88 in the example of FIG. 1) to the RF antenna 54, a wavelength effect or a potential difference (voltage drop) within the RF antenna 54 can be effectively suppressed or reduced. Thus, it is possible to uniformize plasma process characteristics on the semiconductor wafer W, that is, etching characteristics (etching rate, selectivity, or etching profile) both in a circumferential direction and in a diametrical direction.

[Basic Configuration and Operation of the RF Antenna]

Figure 2:
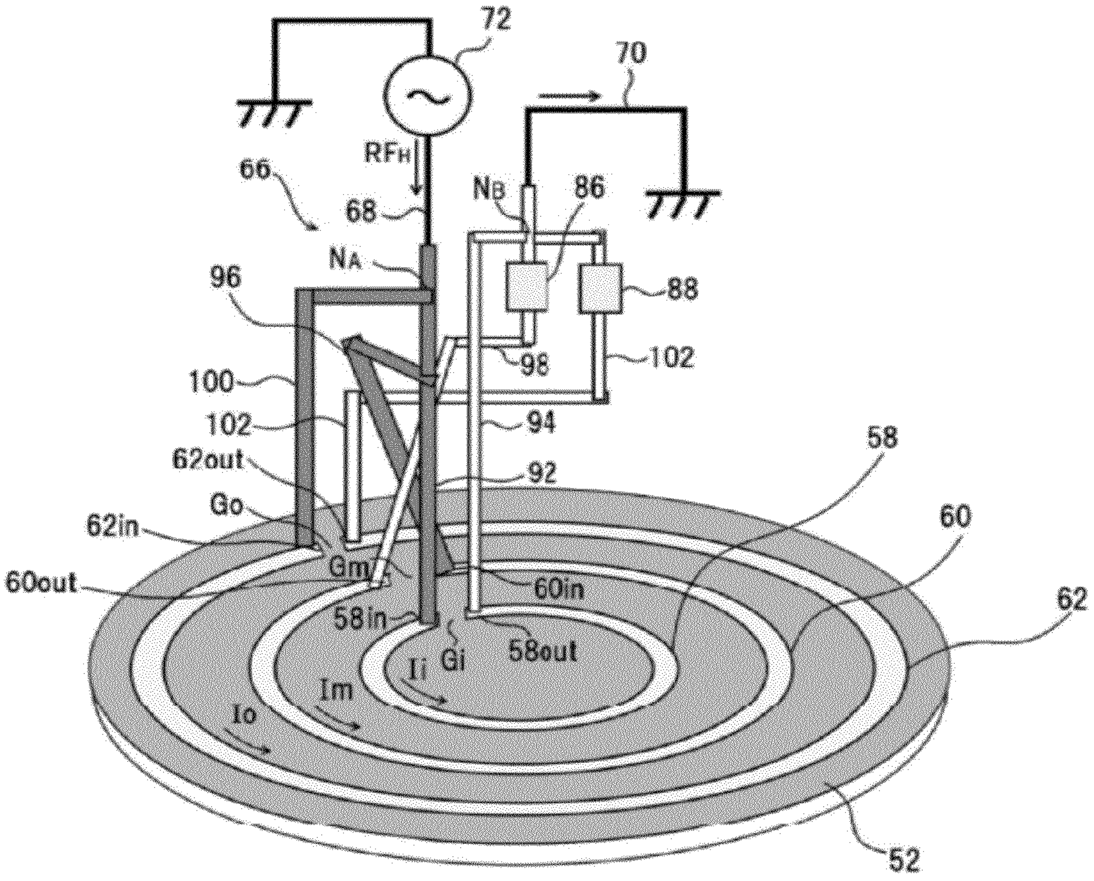
FIG. 2 is a perspective view showing a basic configuration of a layout and an electric connection of a RF antenna in accordance with the illustrative embodiment.
Figure 3:
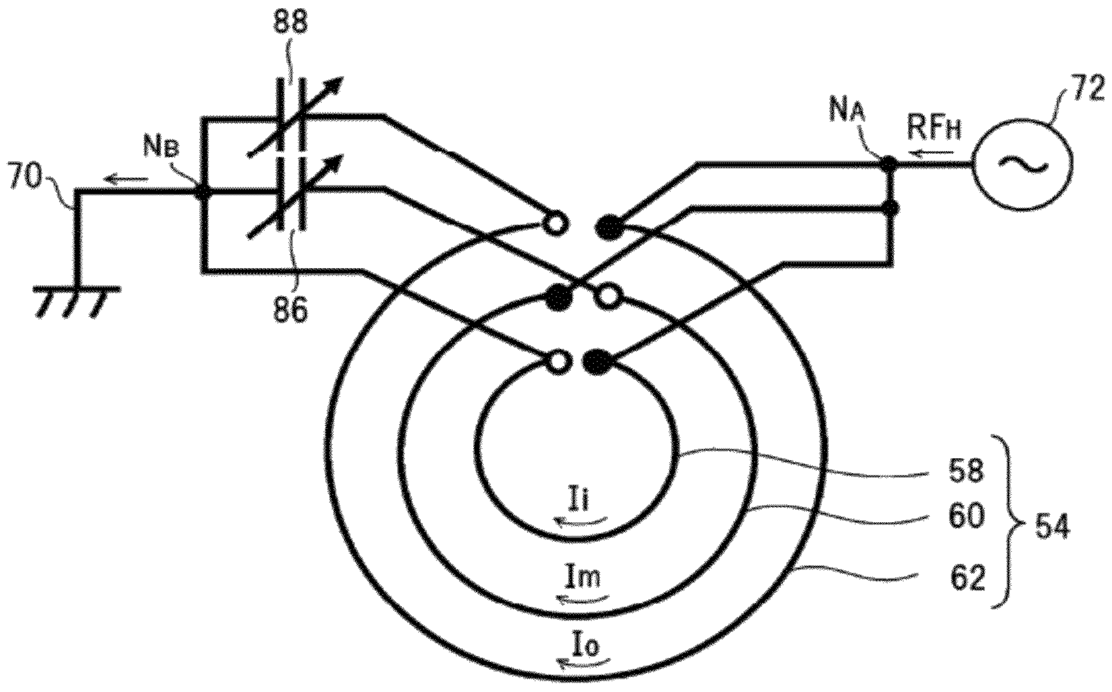
FIG. 3 is a diagram illustrating an electric connection corresponding to the configuration of FIG. 2.
Figure 3:
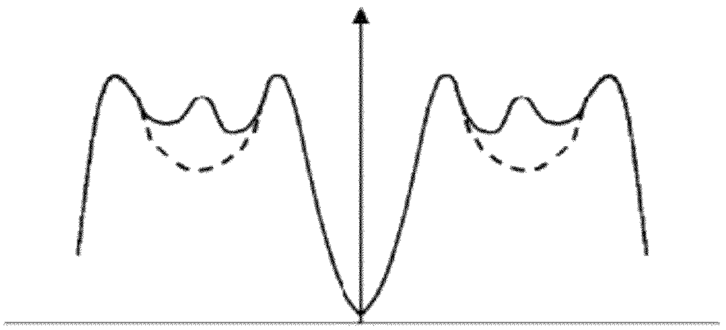

Major features of this inductively coupled plasma etching apparatus include a configuration of an internal spatial layout and an electric connection of the RF antenna 54. FIGS. 2 and 3 illustrate a basic configuration of a layout and an electric connection (circuit) of the RF antenna 54 in accordance with the illustrative embodiment.

As illustrated in FIG. 2, the inner coil 58 is formed of a circular-ring shaped coil wound one single round with a gap or a space $G_i$ therein, and the inner coil 58 has a constant radius. Further, the inner coil 58 is positioned near the central portion of the processing chamber 10 in the diametrical direction. One end of the inner coil 58, i.e., an RF input terminal 58in is connected to the RF power supply line 68 of the high frequency power supply unit 66 via the first node $N_A$ and a connection conductor 92 extending upwardly. The other end of the inner coil 58, i.e., an RF output terminal 58out is connected to the earth line 70 via the second node $N_B$ and a connection conductor 94 extending upwardly.

The intermediate coil 60 is formed of a circular-ring shaped coil wound one single round with a gap or a space $G_m$ therein, and the intermediate coil 60 has a constant radius. Further, the intermediate coil 60 is positioned at an intermediate portion of the chamber 10 to be located outer than the inner coil 58 in the diametrical direction. One end of the intermediate coil 60, i.e., an RF input terminal 60in is adjacent to the RF output terminal 58out of the inner coil 58 in the diametrical direction. Further, the RF input terminal 60in is connected to the RF power supply line 68 of the high frequency power supply unit 66 via the first node $N_A$ and a connection conductor 96 extending upwardly. The other end of the intermediate coil 60, i.e., an RF output terminal 60out is adjacent to the RF input terminal 58in of the inner coil 58 in the diametrical direction. Further, the RF output terminal 60out is connected to the earth line 70 via the second node $N_B$ and a connection conductor 98 extending upwardly.

The outer coil 62 is formed of a circular-ring shaped coil wound one single round with a gap or a space $G_o$ therein, and the outer coil 62 has a constant radius. The outer coil 62 is positioned near a sidewall of the processing chamber 10 to be located outer than the intermediate coil 60 in the diametrical direction. One end of the outer coil 62, i.e., an RF input terminal 62in is adjacent to the RF output terminal 60out of the intermediate coil 60 in the diametrical direction. The RF input terminal 62in is connected to the RF power supply line 68 of the high frequency power supply unit 66 via the first node $N_A$ and a connection conductor 100 extending upwardly. The other end of the outer coil 62, i.e., an RF output terminal 62out is adjacent to the RF input terminal 60in of the intermediate coil 60 in the diametrical direction. The RF output terminal 62out is connected to the earth line 70 via the second node $N_B$ and a connection conductor 102 extending upwardly.

As illustrated in FIG. 2, the connection conductors 92 to 102 upwardly extending from the RF antenna 54 serve as branch lines or connecting lines in horizontal directions while spaced apart from the dielectric window 52 at a sufficiently large distance (i.e., at considerably high positions). Accordingly, electromagnetic influence upon the coils 58, 60, and 62 can be reduced.

In the above-described coil arrangement and segment connection structure within the RF antenna 54, when traveling along each of the coils from the high frequency power supply 72 to the ground potential member via the RF power supply line 68, the RF antenna 54, and the earth line 70, more directly, when traveling along each of the coils from the first node $N_A$ to the second node $N_B$ via high frequency branch transmission lines of the coils 58, 60, and 62 within the RF antenna 54, a direction passing through the inner coil 58 and the outer coil 62 is a counterclockwise (forward) direction in FIG. 2, whereas a direction passing through the intermediate coil 60 is a clockwise (backward) direction in FIG. 2. In this way, as an important feature of the plasma etching apparatus in accordance with the illustrative embodiment, the direction passing through the intermediate coil 60 is opposite to directions passing through the inner coil 58 and the outer coil 62 in the circumferential direction.

In the inductively coupled plasma etching apparatus in accordance with the illustrative embodiment, a high frequency current supplied from the high frequency power supply unit 66 flows through each of components within the RF antenna 54. As a result, high frequency AC magnetic fields distributed in loop shapes are formed around the inner coil 58, the intermediate coil 60, and the outer coil 62 of the RF antenna 54 according to the Ampere’s Law. Further, under the dielectric window 52, magnetic force lines passing through the processing space in the radial direction are formed even in a relatively far below the dielectric window 52.

In this case, a radial directional (horizontal) component of a magnetic flux density in the processing space may be zero (0) constantly at a central region and a periphery of the processing chamber 10 regardless of a magnitude of the high frequency current. Further, the radial directional (horizontal) component of the magnetic flux density in the processing space may have a maximum value at a certain portion therebetween. An intensity distribution of the induced electric field in the azimuth direction generated by the AC magnetic field of the high frequency may have the same pattern as the magnetic flux density distribution in the diametrical direction. That is, an electron density distribution within the donut-shaped plasma in the diametrical direction may substantially correspond to a current split in the RF antenna 54 in a macro view.

The RF antenna 54 of the illustrative embodiment is different from a typical spiral coil wound from its center or inner peripheral end to an outer peripheral end thereof. That is, the RF antenna 54 includes the circular ring-shaped inner coil 58 locally disposed at the central portion of the antenna; the circular ring-shaped intermediate coil 60 locally disposed at the intermediate portion of the antenna; and the circular ring-shaped outer coil 62 locally disposed at a peripheral portion of the antenna. The current distribution in the RF antenna 54 may have a concentric shape corresponding to each of the coils 58, 60, and 62.

Here, a high frequency current $I_i$ (hereinafter, referred to as an "inner coil current") may be regular or uniform over the loop of the inner coil 58 and flows in the inner coil 58. A high frequency current $I_m$ (hereinafter, referred to as an "intermediate coil current") may be regular or uniform over the loop of the intermediate coil 60 and flows in the intermediate coil 60. A high frequency current $I_o$ (hereinafter, referred to as an "outer coil current") may be regular or uniform over the loop of the outer coil 62 and flows in the outer coil 62. In accordance with the illustrative embodiment, in the above-described coil arrangement and electric connection structure (FIG. 2), by varying or setting electrostatic capacitances $C_{86}$ and $C_{88}$ of the intermediate capacitor 86 and the outer capacitor 88 within respective certain ranges, the directions of all the coil currents $I_i$, $I_m$, and $I_o$ flowing through the coils 58, 60, and 62 can be made identical in the circumferential direction.

Therefore, in the donut-shaped plasma generated below (inside) the dielectric window 52 of the processing chamber 10, a current density (i.e. plasma density) may be remarkably increased (maximized) at positions right below the inner coil 58, the intermediate coil 60, and the outer coil 62. Thus, a current density distribution within the donut-shaped plasma may not be uniform in the diametrical direction and may have an uneven profile. However, since the plasma is diffused in all directions within the processing space of the processing chamber 10, a plasma density in a vicinity of the susceptor 12, i.e., on the substrate W, may become very uniform.

In the present illustrative embodiment, the inner coil 58, the intermediate coil 60, and the outer coil 62 have the circular ring shapes. Further, since regular or uniform high frequency currents flow in the circumferential directions of the coils, a plasma density distribution can constantly be uniformized in the circumferential directions of the coils in the vicinity of the susceptor 12, i.e., on the substrate W as well as within the donut-shaped plasma.

Further, in the diametrical direction, by varying and setting the electrostatic capacitances $C_{86}$ and $C_{88}$ of the intermediate capacitor 86 and the outer capacitor 88 to have appropriate values within certain ranges, it is possible to adjust a balance between the currents $I_i$, $I_m$, and $I_o$ flowing in the inner coil 58, the intermediate coil 60, and the outer coil 62, respectively. Accordingly, the plasma density distribution within the donut-shaped plasma can be controlled as desired. Thus, the plasma density distribution in the vicinity of the susceptor 12, i.e., on the substrate W can be controlled as desired, and the plasma density distribution can be easily uniformized with high accuracy.

In the illustrative embodiment, the wavelength effect and the voltage drop within the RF antenna 54 depend on a length of each of the coils 58, 60, and 62. Accordingly, by setting the length of each of the coils to prevent the wavelength effect from occurring in the coils 58, 60, and 62, both the wavelength effect and the voltage drop within the RF antenna 54 can be reduced. Desirably, in order to prevent the wavelength effect, the length of each of the coils 58, 60, and 62 needs to be set to be shorter than a ¼ wavelength of the high frequency $RF_H$.

The condition that the length of each coil is less than about ¼ wavelength of the high frequency $RF_H$ is easily satisfied as a diameter of a coil is smaller and the number of windings is smaller. Accordingly, in the RF antenna, the inner coil 58 having a smallest diameter can be easily subject to a configuration of multiple windings. The outer coil 62 having a largest diameter is desirably subject to a single winding, rather than multiple windings. Although the arrangement of the intermediate coil 60 depends on a diameter of the semiconductor wafer W, the frequency of the high frequency $RF_H$, or the like, the intermediate coil 60 is desirably subject to a single winding, like the outer coil 62.

[Functions of Capacitors Added to the RF Antenna]

Another important feature of the inductively coupled plasma etching apparatus in accordance with the illustrative embodiment includes a function or operation of a variable capacitor (especially, the intermediate capacitor 86) added to the RF antenna 54.

In the inductively coupled plasma etching apparatus of the present embodiment, by varying the electrostatic capacitance $C_{86}$ of the intermediate capacitor 86, a combined reactance of the intermediate coil 60 and the intermediate capacitor 86 (hereinafter, referred to as an "intermediate combined reactance") $X_m$ can be varied, and a magnitude of the intermediate current $I_m$ flowing in the intermediate coil 60 can also be varied.

Here, there is a desirable range for variation of the electrostatic capacitance $C_{86}$. That is, since the intermediate coil 60 is connected in an opposite direction against those of the inner coil 58 and the outer coil 62 with respect to the high frequency power supply unit 66 as stated above, it may be desirable to vary and set the electrostatic capacitance $C_{86}$ of the intermediate capacitor 86 to allow the intermediate combined reactance $X_m$ to have a negative value (i.e., to allow a capacitive reactance of the intermediate capacitor 86 to be larger than an inductive reactance of the intermediate coil 60). In other aspect, it may be desirable to vary and set the electrostatic capacitance $C_{86}$ of the intermediate capacitor 86 within a range smaller than an electrostatic capacitance obtained when a series resonance occurs in a serial circuit including the intermediate coil 60 and the intermediate capacitor 86.

As state above, in the RF antenna 54 in which the intermediate coil 60 is connected in the opposite direction against those of the inner coil 58 and the outer coil 62, the electrostatic capacitance $C_{86}$ of the intermediate capacitor 86 is varied within the range in which the intermediate combined reactance $X_m$ has a negative value. Thus, the direction of the intermediate current $I_m$ flowing in the intermediate coil 60 becomes equal to the directions of the inner current $I_i$ and the outer current $I_o$ flowing in the inner coil 58 and the outer coil 62 in the circumferential direction, respectively. Further, the magnitude of the intermediate current $I_m$ may be gradually increased from about zero. By way of example, the magnitude of the intermediate current $I_m$ may be set to be equal to or smaller than, e.g., about 1/10 to about 1/5 of the magnitude of the inner current $I_i$ and the outer current $I_o$.

Figure 4A:
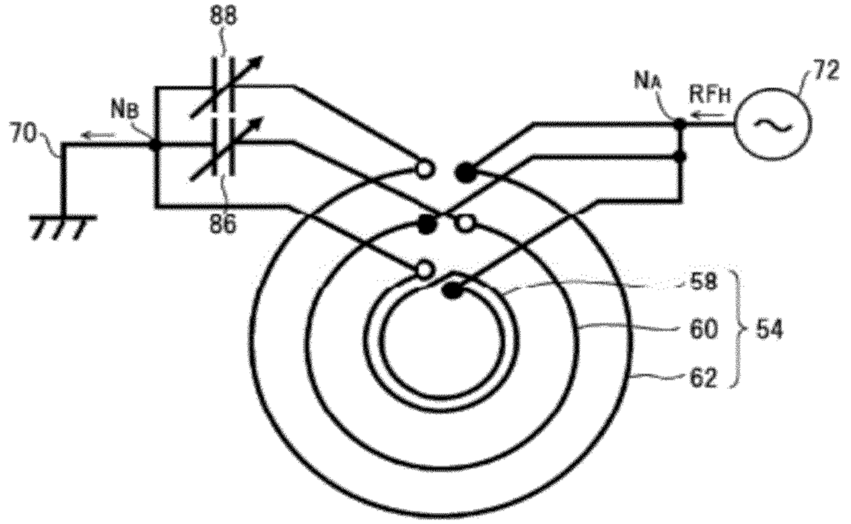
FIG. 4A is a diagram showing a configuration of a layout and an electric connection of a RF antenna used in an experiment in accordance with the first illustrative embodiment.
Figure 4B:
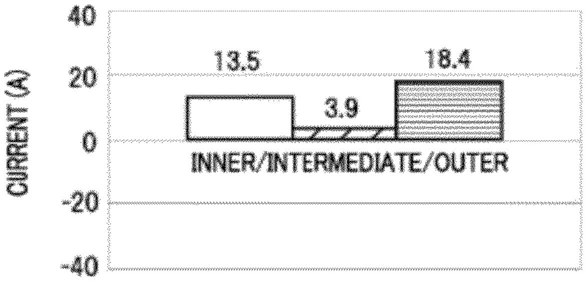
FIG. 4B is a diagram illustrating one of combinations of coil currents adopted in the experiment.
Figure 4C:
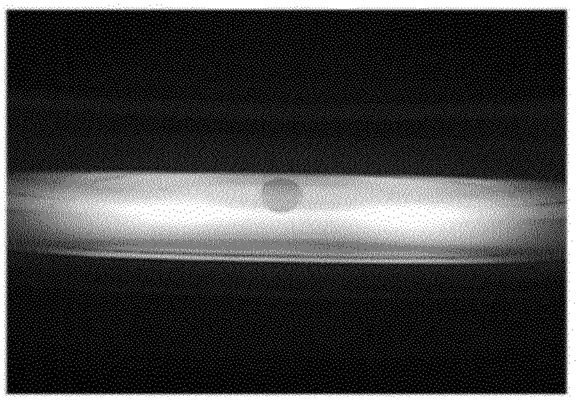
FIG. 4C is a diagram showing a picture image of donut-shaped plasma obtained with the combination of coil currents of FIG. 4B.

Further, it is proved by an experiment as depicted in FIGS. 4A to 4C that in the inductively coupled plasma etching apparatus using the RF antenna 54 having the three coils 58, 60, and 62 which are concentrically connected in parallel, if the intermediate current $I_m$ is set to sufficiently be smaller than the inner current $I_i$ and the outer current $I_o$, the density within the donut-shaped plasma generated directly under the chamber 10 can be uniformized effectively and precisely.

In the present experiment, as illustrated in FIG. 4A, the inner coil 58 of the RF antenna 54 is wound in two turns and has a diameter of about 100 mm. Each of the intermediate coil 60 and the outer coil 62 is wound one round (in a single turn). Further, the intermediate coil 60 has a diameter of about 200 mm and the outer coil 62 has a diameter of about 300 mm. As major processing conditions, a frequency of a high frequency power ($RF_H$) is about 13.56 MHz; a RF power is about 1500 W; a pressure within the chamber 10 is about 100 mTorr; a gaseous mixture of Ar and $O_2$ is used as a processing gas; and a flow rate of $Ar/O_2$ is about 300 sccm/about 30 sccm, respectively.

In this experiment, the electrostatic capacitances $C_{86}$ and $C_{88}$ of the intermediate capacitor 86 and the outer capacitor 88 are varied, and the inner coil current $I_i$, the intermediate coil current $I_m$ and the outer coil current $I_o$ are adjusted to about 13.5 A, about 3.9 A, and about 18.4 A, respectively, as shown in FIG. 4B. As a result, it is verified that the plasma density distribution is uniformized in the diametrical direction, as shown in FIG. 4C.

Even when the intermediate coil current $I_m$ is set to be 0 A (i.e., the intermediate coil 60 is not provided), plasma generated at vicinities of positions directly under the inner coil 58 and the outer coil 62 may be diffused in the diametrical direction. Thus, plasma having a plasma density which is not low (slightly smaller than the plasma densities directly under the two coils 58 and 62) may be distributed in a central region between the two coils 58 and 62 as indicated by dashed lines in FIG. 3. Accordingly, if the small magnitude of the current $I_m$ flows through the intermediate coil 60 between the two coils 58 and 62 in the same circumferential direction as those of the currents $I_i$ and $I_o$ flowing in the two coils 58 and 62, respectively, inductively coupled plasma may be generated to be appropriately increased near a region directly under the intermediate coil 60. As a result, the plasma density can be uniformized in the diametrical direction.

In the present embodiment, in order to set the intermediate current $I_m$ flowing in the intermediate coil 60 to be of a sufficiently small value, the intermediate coil 60 is connected in the opposite direction against those of the inner coil 58 and the outer coil 62, and the electrostatic capacitance $C_{86}$ of the intermediate capacitor 86 is varied within the range in which the intermediate combined reactance $X_m$ has the negative value. In such a case, as the value of the $C_{86}$ is decreased within the range of $X_m<0$, an absolute value of the intermediate combined reactance $X_m$ would be increased. As a result, the intermediate current $I_m$ is decreased (close to zero). Meanwhile, as the value of the $C_{86}$ is increased within the range of $X_m<0$, the absolute value of the intermediate combined reactance $X_m$ would be decreased. As a result, the intermediate current $I_m$ is increased.

Now, the function of the intermediate capacitor 86 will be described in further detail with reference to FIGS. 5A and 5B.

Figure 5A:
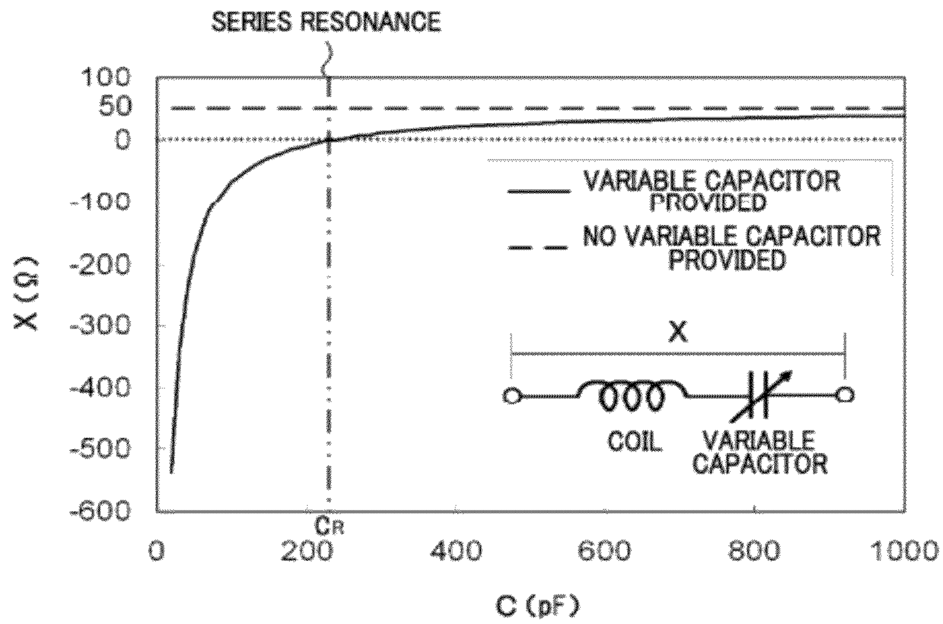
FIG. 5A is a plot diagram illustrating a characteristic of electrostatic capacitance-combined reactance, for describing a function of an intermediate capacitor in accordance with the first illustrative embodiment.
Figure 5B:
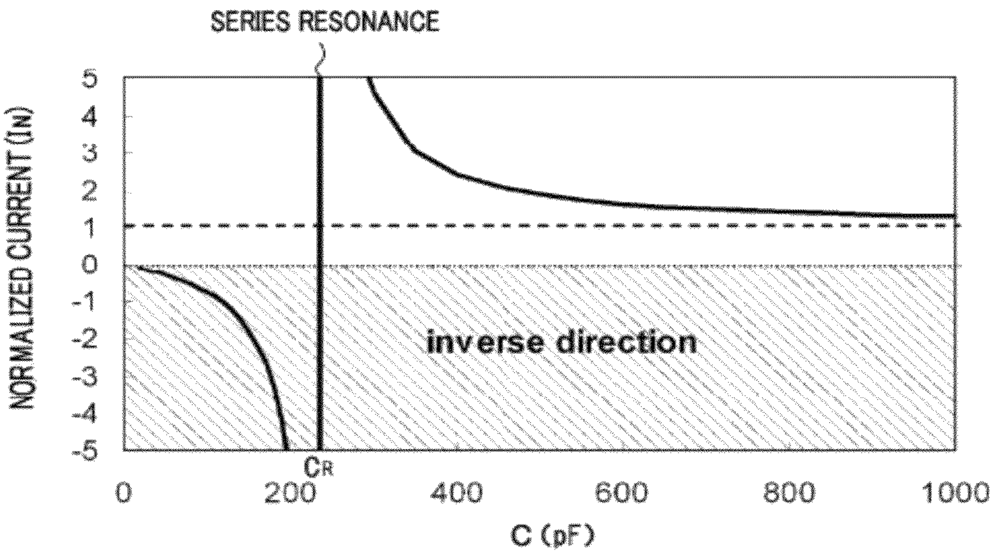
FIG. 5B is a plot diagram illustrating a characteristic of electrostatic capacitance-normalized current, for describing a function of the intermediate capacitor in accordance with the first illustrative embodiment.

FIG. 5A is a plot diagram of a combined reactance value X when an electrostatic capacitance C of a variable capacitor is varied in the range from about 20 pF to about 1000 pF. Here, the variable capacitor is connected in series with a coil having a reactance of about 50Ω (corresponding to a circular ring-shaped coil wound one single round and having a diameter of about 200 mm including a connection portion). FIG. 5B is a plot diagram showing a normalized value (a ratio to a current flowing when the variable capacitor is not provided) of a current $I_N$ flowing through the coil at this time.

If the electrostatic capacitance C of the variable capacitor is sufficiently small, the combined reactance X has a large negative value. As the electrostatic capacitance C of the variable capacitor increases, the combined reactance also increases over 0Ω corresponding to a series resonance and gradually approaches the reactance (about 50Ω) of the coil.

The current $I_N$ flowing in the coil is proportional to about 1/X and is depicted as below.

$$I_N = \frac{2\pi fL}{2\pi fL - \frac{1}{2\pi fC}} \quad \text{[Equation 1]}$$

Here, f represents a frequency of a high frequency power applied to the coil.

If the electrostatic capacitance C of the variable capacitor is sufficiently small, the current $I_N$ has a negative value approximately close to zero, i.e., becomes a current flowing in an inverse direction. In this state, if the electrostatic capacitance C is increased, the current $I_N$ having the same magnitude as that of the current flowing in the coil when the variable capacitor is not provided flows through the coil in the inverse direction (a state of $I_N=-1$). Accordingly, the magnitude of the current $I_N$ flowing in the inverse direction gradually increases as the electrostatic capacitance C approaches a value $C_R$ obtained when a series resonance occurs. Then, after the series resonance point ($C_R$), the current $I_N$ flows in a positive direction and has a large positive value. From this state, if the electrostatic capacitance C is further increased, the current $I_N$ gradually approaches a state of ($I_N=+1$), where the current $I_N$ of the same magnitude and the same flow direction as those of the current flowing in the coil when the variable capacitor is not provided flows.

Here, it should be noted that in the serial circuit having the coil and the variable capacitor, it is not possible to obtain a state where a sufficiently small positive magnitude of current $I_N$ (i.e., smaller than +1) flows. It is inevitable that the current $I_N$ has the same as or larger magnitude ($I_N \geq 1$) than that of the current flowing when the variable capacitor is not provided. In order to reduce the current $I_N$ to a positive value smaller than when the variable capacitor is not provided, the electrostatic capacitance C needs to be varied within a range smaller than the series resonance point $C_R$, i.e., within a range where the current $I_N$ flows in the inverse direction.

Thus, in accordance with the present illustrative embodiment, for the intermediate coil 60, the electrostatic capacitance $C_{86}$ of the intermediate capacitor 86 is varied in the range where the combined reactance $X_m$ has the negative value. Further, the intermediate coil 60 is connected in the opposite direction to those of the inner coil 58 and the outer coil 62 to allow the intermediate coil current $I_m$ to flow in the same circumferential direction as those of the inner coil current $I_i$ and the outer coil current $I_o$. Accordingly, it is possible that a sufficiently small magnitude of intermediate coil current $I_m$ flows through the intermediate coil 60 in the same circumferential direction as those of the inner coil current $I_i$ and the outer coil current $I_o$. Thus, the plasma density distribution can be precisely uniformized in the diametrical direction.

Here, there is a restriction in setting the current $I_m$ flowing through the intermediate coil 60 connected in the opposite direction to those of the other coils. That is, in a coil (in the present illustrative embodiment, the intermediate coil 60) connected in the opposite direction to those of the other coils (the inner coil 58 and the outer coil 62) among a multiple number of coils electrically connected in parallel, it is not possible to allow the magnitude of the intermediate coil current $I_m$ to be same as those of the inner coil current $I_i$ and the outer coil current $I_o$.

In the serial circuit having the coil connected in the opposite direction to those of the other coils and the variable capacitor, if the electrostatic capacitance of the variable capacitor is increased from a sufficiently small value under the condition where the combined reactance has a negative value, the current is also increased. However, the current reaches a range where the combined reactance has the same value as that of a combined reactance of other coils in a reverse sign. In view of the fact that a current ratio is proportional to a reciprocal number of a reactance in a parallel reactance circuit, this state implies that the same magnitude of current having the reverse sign flows. In this state, the entire parallel reactance circuit becomes a parallel resonance circuit and has very large load impedance when viewed from the matching unit. In the typical matching unit, such a range is out of a matching range or power transmission efficiency may be extremely deteriorated. Thus, the same magnitude of the current as those of the currents flowing in the other coils 58 and 62 should not be flown to the intermediate coil 60 connected in the opposite direction to those of the other coils.

The outer capacitor 88 added to the RF antenna 54 in addition to the intermediate capacitor 86 functions to adjust a balance between the inner current $I_i$ flowing in the inner coil 58 and the outer current $I_o$ flowing in the outer coil 62. As described above, the magnitude of the intermediate current $I_m$ flowing in the intermediate coil 60 is normally small and most of the high frequency current supplied from the high frequency power supply unit 66 to the RF antenna 54 is split to the inner coil 58 and the outer coil 62. Here, by varying the electrostatic capacitance $C_{88}$ of the outer capacitor 88, a combined reactance $X_o$ of the outer coil 62 and the outer capacitor 88 (hereinafter, referred to as an "outer combined reactance") can be varied, and, a split ratio between the inner current $I_i$ and the outer current $I_o$ can be also adjusted.

Furthermore, both of the inner coil 58 and the outer coil 62 are connected in a forward direction. Thus, in order to allow the inner current $I_i$ and the outer current $I_o$ to flow in the same circumferential direction, the electrostatic capacitance $C_{88}$ of the outer capacitor 88 needs to be varied in a range in which the outer combined reactance $X_o$ has a positive value. In this case, as the value of $C_{83}$ is decreased within the range of $X_o>0$, the value of the outer combined reactance $X_o$ would be decreased. As a result, the value of the outer current $I_o$ would be increased relatively, whereas the inner current $I_i$ would be decreased relatively. Meanwhile, as the value of $C_{88}$ is increased within the range of $X_0>0$, the value of the outer combined reactance $X_o$ would be increased. As a consequence, the outer current $I_o$ would be decreased relatively, whereas the inner current $I_i$ would be increased relatively.

Further, there may be considered a configuration of connecting a capacitor to the inner coil 58 in series instead of the outer capacitor 88, i.e., a configuration of providing an inner capacitor. However, when no capacitor is added to the RF antenna 54, the current is concentrated on the inner coil 58 having the lowest impedance (particularly, reactance) which is proportional to the coil diameter. Thus, the plasma density within the donut-shaped plasma may be remarkably increased at the central portion thereof. Thus, adding the inner capacitor may increase such concentration of the current on the inner coil 58 and reinforce the unbalance between the inner coil current $I_I$ and the outer coil current $I_o$. Thus, it is not desirable to add the inner capacitor for the control of the plasma density distribution.

As described above, in the inductively coupled plasma etching apparatus of the present embodiment, by varying the electrostatic capacitance $C_{88}$ of the outer capacitor 88, the balance between the inner current $I_i$ flowing in the inner coil 58 and the outer current $I_o$ flowing in the outer coil 62 can be adjusted as desired. Furthermore, as stated above, by varying the electrostatic capacitance $C_{86}$ of the intermediate capacitor 86, the balance between the intermediate current $I_m$ flowing in the intermediate coil 60 and the inner current $I_i$ flowing in the inner coil 58 and the balance between the intermediate current $I_m$ flowing in the intermediate coil 60 and the outer current $I_o$ flowing in the outer coil 62 can also be adjusted as desired.

[Other Modification Examples or Other Illustrative Embodiments of RF Antenna]

Figure 6:
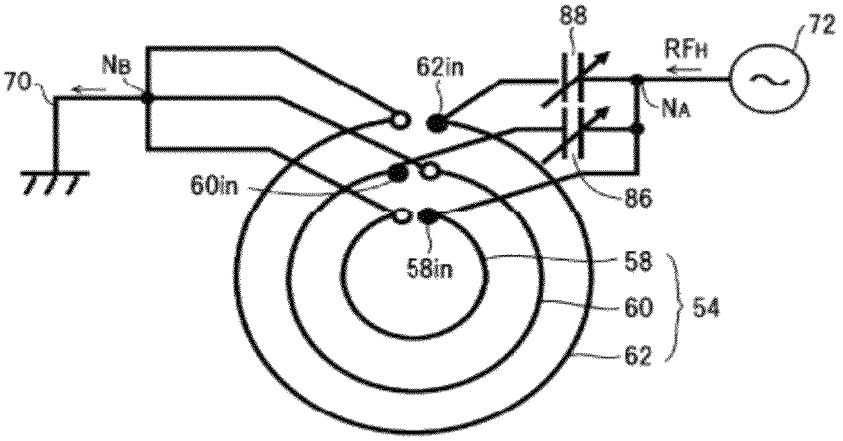
FIG. 6 is a diagram showing a configuration of a layout and an electric connection of a RF antenna in accordance with a modification example of the first illustrative embodiment.

In the above-described illustrative embodiment, the intermediate capacitor 86 is connected between the RF output terminal 60out of the intermediate coil 60 and the second node $N_B$ of the earth line 70, and the outer capacitor 88 is connected between the RF output terminal 62out of the outer coil 62 and the second node $N_B$ of the earth line 70. As a modification example depicted in FIG. 6, there may be considered a configuration in which the intermediate capacitor 86 is connected between the first node $N_A$ of the high frequency power supply 72 and the RF input terminal 60in of the intermediate coil 60, and the outer capacitor 88 is connected between the first node $N_A$ and the RF input terminal 62in of the outer coil 62.

Figure 7:
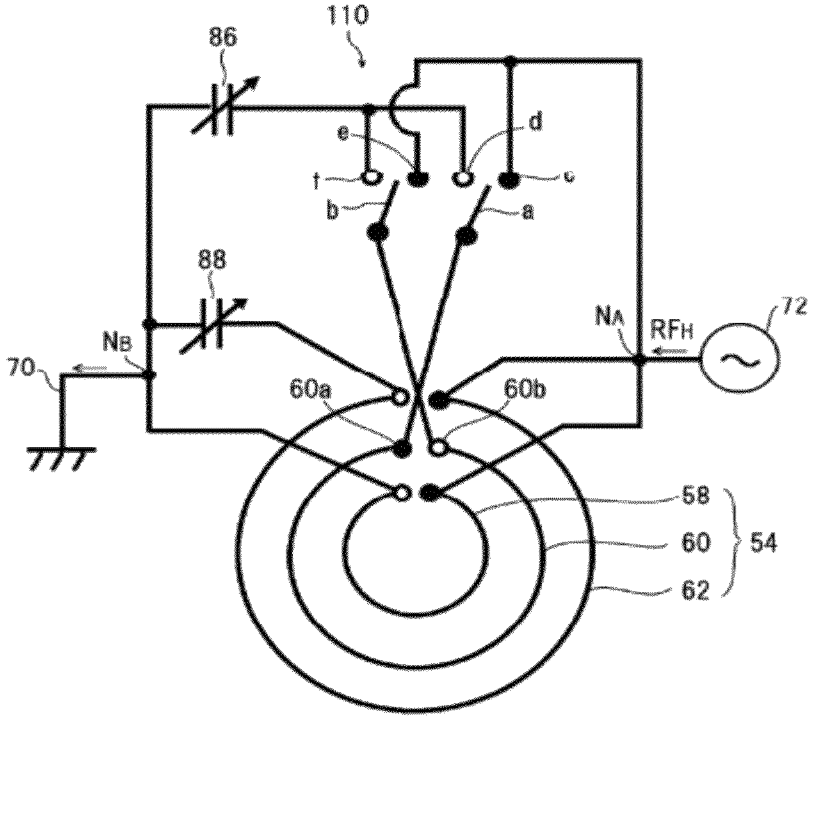
FIG. 7 is a diagram showing a configuration of a layout and an electric connection of a RF antenna in accordance with a second illustrative embodiment.

In a second illustrative embodiment, as illustrated in FIG. 7, there may be provided a changeover switch 110 for switching the connection of the intermediate coil 60 either to the forward direction or to a backward direction between the first node $N_A$ and the second node $N_B$. In the configuration shown in FIG. 7, two movable contact points 110*a* and 110*b* of the changeover switch 110 are connected to both ends 60*a* and 60*b* of the intermediate coil 60, respectively. The first movable contact point 110*a* is switchable between a first power supply side fixed contact point 110*c* connected to the first node $N_A$ of the high frequency power supply 72 and a first earth side fixed contact point 110*d* connected to the second node $N_B$ of the earth line 70. The second movable contact point 110*b* is switchable between a second power supply side fixed contact point 110*e* connected to the first node $N_A$ of the high frequency power supply 72 and a second earth side fixed contact point 110*f* connected to the second node $N_B$ of the earth line 70.

In this configuration, if the first and second movable contact points 110*a* and 110*b* are switched into the first power supply side fixed contact point 110*c* and the second earth side fixed contact point 110*f*, respectively, the intermediate coil 60 is connected in the backward direction. If the first and second movable contact points 110*a* and 110*b* are switched to the first earth side fixed contact point 110*d* and the second power supply side fixed contact point 110*e*, the intermediate coil 60 is connected in the forward direction.

Figure 8:
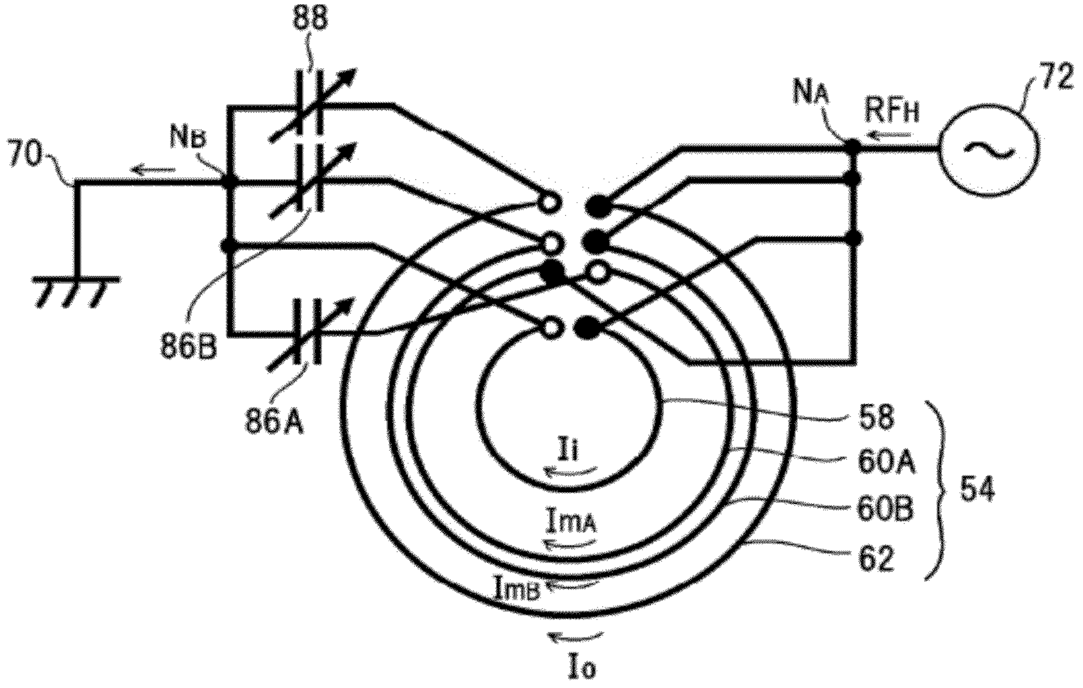
FIG. 8 is a diagram showing a configuration of a layout and an electric connection of a RF antenna in accordance with a third illustrative embodiment.

Further, as a third illustrative embodiment, a first intermediate coil 60A connected in the backward direction and a second intermediate coil 60B connected in the forward direction may be used, as illustrated in FIG. 8. In such a configuration, it may be desirable to connect first and second capacitors 86A and 86B to the first and second intermediate coils 60A and 60B in series, respectively, between the first node $N_A$ and the second node $N_B$.

In this illustrative embodiment, when an intermediate coil current $(I_m(I_{mA}+I_{mB}))$ equal to or larger than the inner coil current $I_i$ and the outer coil current $I_o$ is required, an electrostatic capacitance $C_{86B}$ of the second intermediate capacitor 86B on the second intermediate coil 60B in the forward direction is adjusted to become closer to the series resonance point $C_R$ from a large value and an electrostatic capacitance $C_{86A}$ of the first intermediate capacitor 86A on the first intermediate coil 60A in the backward direction is adjusted to become closer to a minimum value. Meanwhile, when an intermediate coil current $(I_m(I_{mA}+I_{mB}))$ sufficiently smaller than the inner coil current $I_i$ and the outer coil current $I_o$ is required, the electrostatic capacitance $C_{86B}$ of the second intermediate capacitor 86B is adjusted to become closer to the minimum value and the electrostatic capacitance $C_{86A}$ of the first intermediate capacitor 86A is adjusted between the minimum value and the series resonance point $C_R$.

Figure 9A:
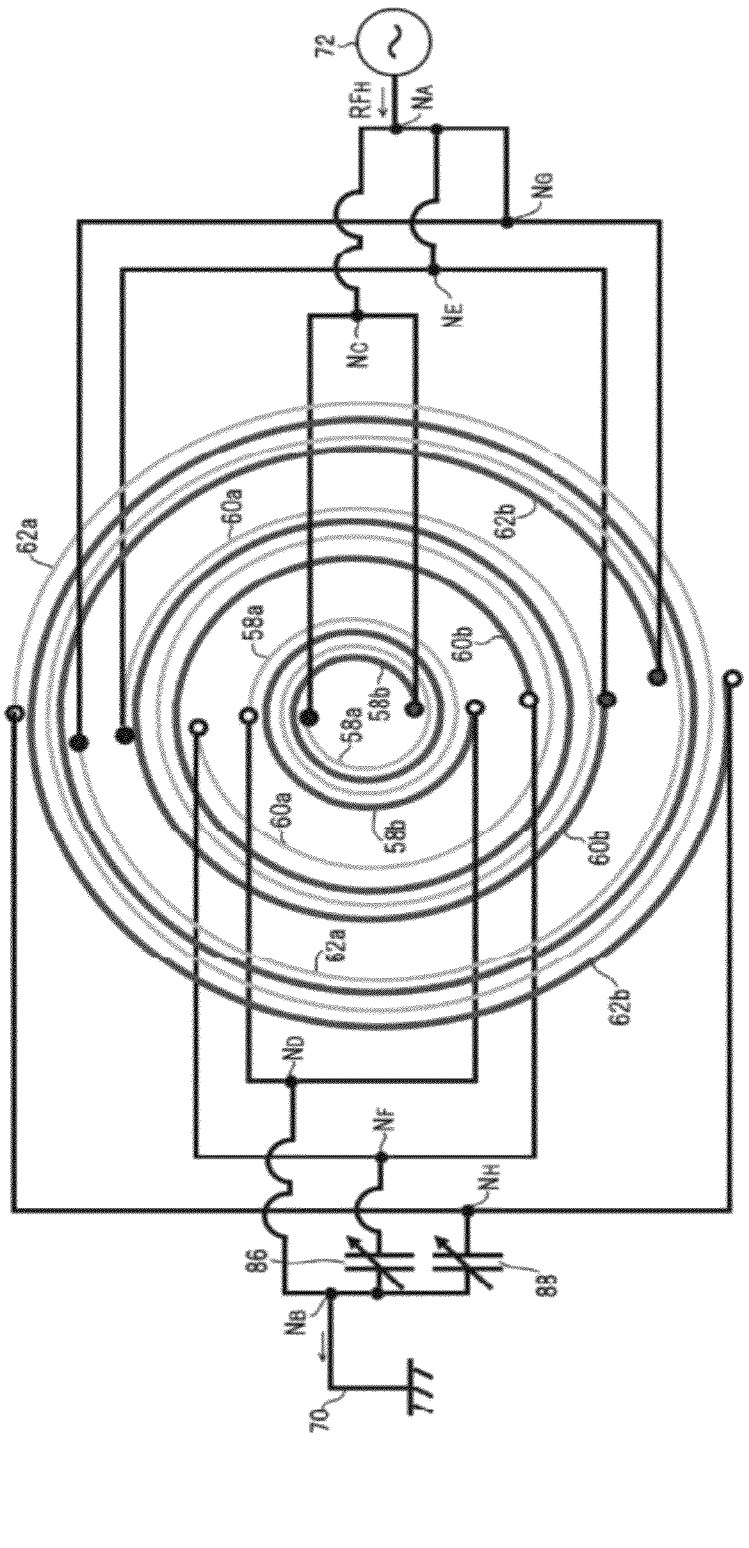
FIG. 9A is a diagram showing a configuration of a layout and an electric connection of a RF antenna in accordance with a fourth illustrative embodiment.

FIG. 9A shows a fourth illustrative embodiment in which each of the coils (inner coil 58/intermediate coil 60/outer coil 62) of the RF antenna 54 is formed of a pair of spiral coils that are spatially and electrically parallel to each other. These spiral coils may be used unless a wavelength effect is a problem.

In the illustrated embodiment, the inner coil 58 is formed of a pair of spiral coils 58*a* and 58*b* deviated 180° from each other in the circumferential direction. These spiral coils 58*a* and 58*b* are electrically connected in parallel between a node $N_C$ provided at a downstream side of the node $N_A$ of the high frequency power supply 72 and a node $N_D$ provided at an upstream side of the node $N_B$ of the earth line 70.

The intermediate coil 60 is formed of a pair of spiral coils 60*a* and 60*b* deviated 180° from each other in the circumferential direction. These spiral coils 60*a* and 60*b* are electrically connected in parallel between a node $N_E$ provided at the downstream side of the node $N_A$ of the high frequency power supply 72 and a node $N_F$ provided at the upstream side of the node $N_B$ of the earth line 70 (and the intermediate capacitor 86).

The outer coil 62 is formed of a pair of spiral coils 62*a* and 62*b* deviated 180° from each other in the circumferential direction. These spiral coils 62*a* and 62*b* are electrically connected in parallel between a node $N_G$ provided at the downstream side of the node $N_A$ of the high frequency power supply 72 and a node $N_H$ provided at the upstream side of the node $N_B$ of the earth line 70 (and the outer capacitor 88).

As in the above configurations, even when using these parallel spiral coils, the inner coil 58 and the outer coil 62 are connected in the forward direction, whereas the intermediate coil 60 is connected in the backward direction. That is, when traveling along each of the coils one round from the first node $N_A$ to the second node $N_B$ via the respective high frequency branch transmission lines, a direction passing through the inner coil 58 (58*a* and 58*b*) and the outer coil 62 (62*a* and 62*b*) are counterclockwise direction in FIG. 9A, whereas the direction passing through the intermediate coil 60 (60*a* and 60*b*) is clockwise direction in FIG. 9A.

Figure 9B:
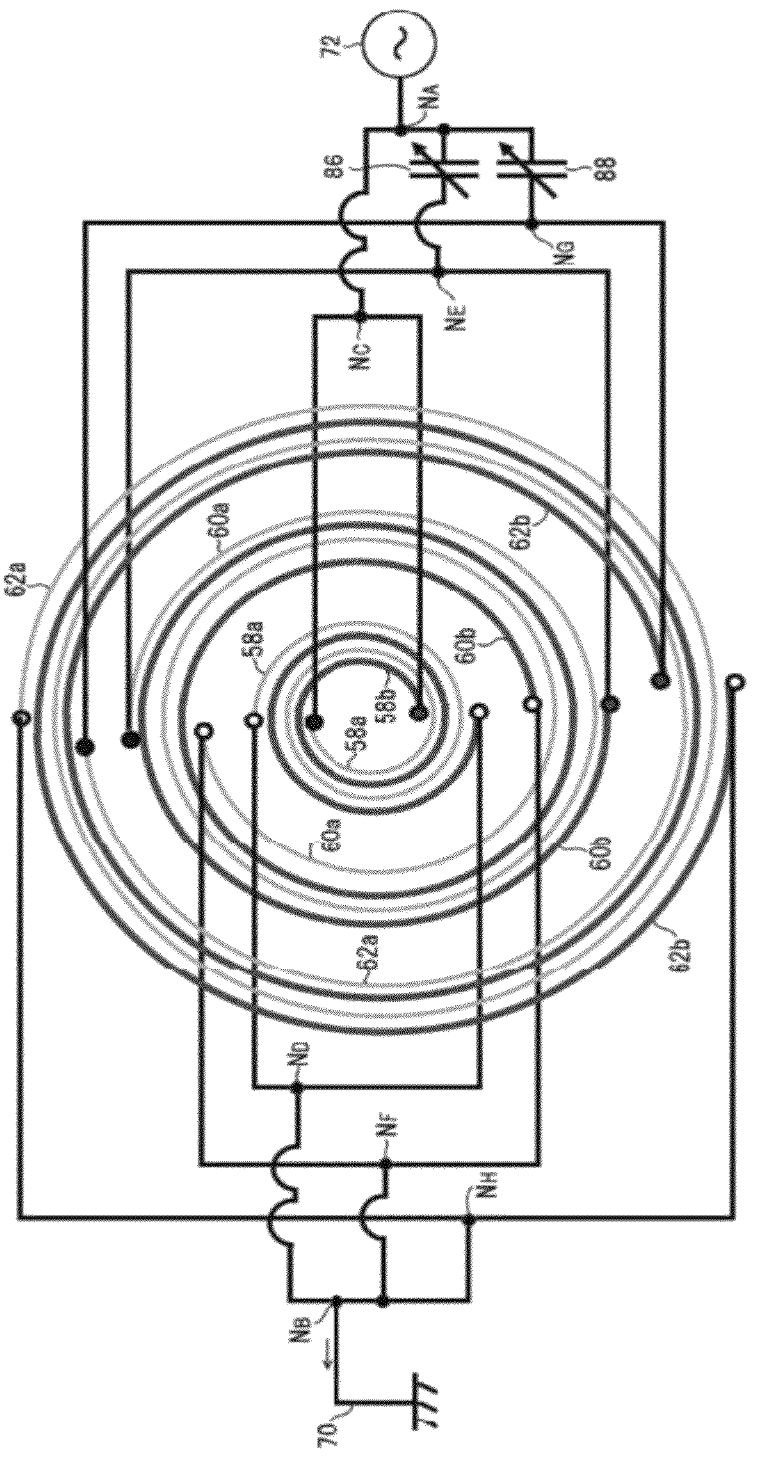
FIG. 9B is a diagram showing a modification example of the fourth illustrative embodiment shown in FIG. 9A.

In this illustrative embodiment, it is also possible that the intermediate capacitor 86 and the outer capacitor 88 are provided on the side of the high frequency power supply 72, as illustrated in FIG. 9B. More specifically, in this configuration, the intermediate capacitor 86 is connected between the node $N_A$ and a $N_E$, and the outer capacitor 88 is connected between the node $N_A$ and $N_G$.

Figure 10A:
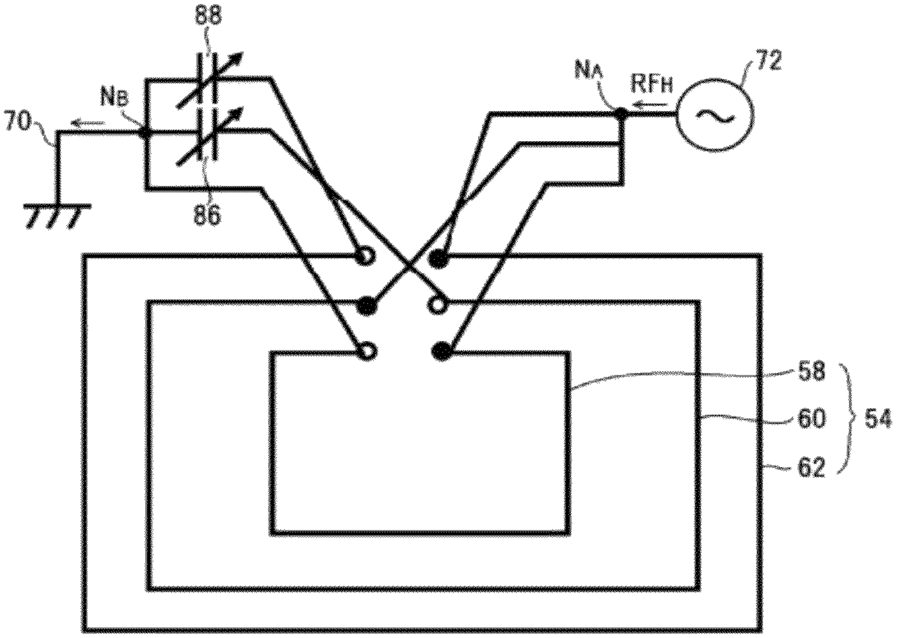
FIG. 10A is a diagram showing a configuration of a layout and an electric connection of a RF antenna in accordance with a fifth illustrative embodiment.
Figure 10B:
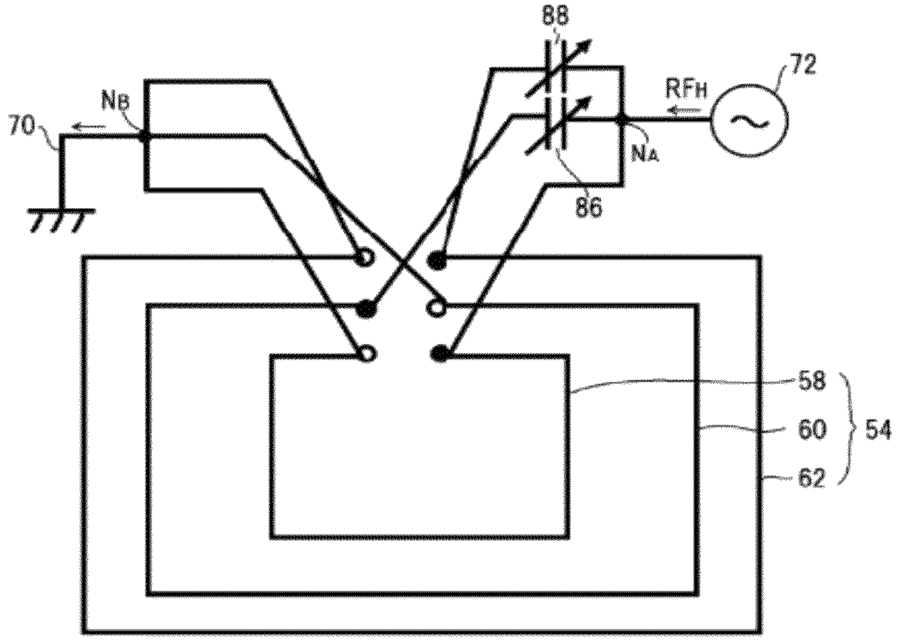
FIG. 10B is a diagram showing a modification example of the fifth illustrative embodiment shown in FIG. 10A.

In the RF antenna 54 in accordance with the illustrative embodiments, the loop of each of the coils 58, 60, and 62 may not be of a circular shape but may be of, but not limited to, a rectangular shape as illustrated in FIGS. 10A and 10B, depending on the shape of the processing target object. Even when the coils 58, 60, and 62 have such polygonal loop shapes, it may be desirable to connect the intermediate coil 60 in the opposite direction to those of the inner coil 58 and the outer coil 62 and to provide the variable intermediate capacitor 86 and the variable outer capacitor 88. Further, a cross sectional shape of the coil may not be limited to a rectangular shape or may be a circular or an ellipse shape. Further, the coil may be a single wire or a stranded wire.

Further, though not shown, it may be also possible to provide another coil at an inside of the inner coil 58 or an outside of the outer coil 62 in the diametrical direction. In overall, four or more coils may be connected in parallel. Further, the inner coil 58 may be omitted, and only the intermediate coil 60 and the outer coil 62 may be provided (in this case, the intermediate coil 60 serves as an inner coil). Alternatively, the outer coil 62 may be omitted, and only the inner coil 58 and the intermediate coil 60 may be provided (in this case, the intermediate coil 60 serves as an outer coil). In these cases, it may be desirable that an inner capacitor is connected in series to the inner coil 58.

Moreover, when necessary, the electrostatic capacitance $C_{86}$ of the intermediate capacitor 86 may be varied within a range where the intermediate combined reactance $X_m$ has a positive value. In such a case, the intermediate coil current $I_m$ flowing in the intermediate coil 60 flows in the opposite direction to those of the inner coil current $I_i$ and the outer coil current $I_o$ flowing in the inner coil 58 and the outer coil 62, respectively, in the circumferential direction. This configuration may be useful when reducing a plasma density directly under the intermediate coil 60 intentionally.

Furthermore, one or more of the capacitors added to the RF antenna 54 (including the intermediate capacitor 86) may be a fixed capacitor or a semi-fixed capacitor. Further, it is also possible to add only the intermediate capacitor 86 to the RF antenna 54.

In the above-described illustrative embodiments, the illustrated configuration of the inductively coupled plasma etching apparatus is nothing more than an example. Not only each component of the plasma generating device but also each component which is not directly relevant to plasma generation can be modified in various manners.

By way of example, the basic shape of the RF antenna may be a dome shape besides the planar shape mentioned above. Further, it may be also possible to have configuration in which a processing gas is introduced into the chamber 10 from the processing gas supply unit through a ceiling. Furthermore, it may be also possible not to apply a high frequency power $RF_L$ for DC bias control to the susceptor 12.

The inductively coupled plasma processing apparatus or the inductively coupled plasma processing method of the present embodiments can be applied to, not limited to a plasma etching technology, other plasma processes such as plasma CVD, plasma oxidation, plasma nitridation, and sputtering. Further, the processing target substrate in the present embodiments may include, but is not limited to a semiconductor wafer, various kinds of substrates for a flat panel display or photo mask, a CD substrate, and a print substrate.

What is claimed is:

1. A plasma processing apparatus, comprising:

a processing chamber having a dielectric window;

a substrate holding unit for holding thereon a processing target substrate within the processing chamber;

a processing gas supply unit configured to supply a processing gas into the processing chamber in order to perform a plasma process on the processing target substrate;

an RF antenna provided outside the dielectric window and configured to generate plasma of the processing gas within the processing chamber by inductive coupling; and a high frequency power supply unit configured to supply a high frequency power having a frequency for generating a high frequency electric discharge of the processing gas to the RF antenna, wherein the RF antenna includes an inner coil and an outer coil with a gap therebetween in a radial direction, and the inner coil and the outer coil are electrically connected in parallel to each other between a first node and a second node on high frequency transmission lines of the high frequency power supply unit, wherein the intermediate coil is coiled oppositely to both the inner coil and the outer coil such that wherein the inner coil and the outer coil are coiled oppositely such that when traveling along each of the inner coil and the outer coil from the first node to the second node via the high frequency transmission lines, a circumferential traveling direction along the inner coil from the first node to the second node is opposite to a circumferential traveling direction along the outer coil from the first node to the second node, a first capacitor electrically connected in series with one coil of the inner coil and the outer coil is provided between the first node and the second node, a direction of current flowing in the inner coil is identical to a direction of a current flowing in the outer coil in a circumferential direction.

2. The plasma processing apparatus of claim 1, wherein an amount of a current flowing in the one coil electrically connected in series with the first capacitor is smaller than that of a current flowing in the other coil of the inner coil and the outer coil.

3. The plasma processing apparatus of claim 1, wherein the first capacitor has an electrostatic capacitance having a value smaller than a value of an electrostatic capacitance obtained when a series resonance of the first capacitor and the coil electrically connected in series with the first capacitor occurs.

4. The plasma processing apparatus of claim 1, wherein the first capacitor is a variable capacitor, and a direction and an amount of the current flowing in the coil electrically connected in series with the first capacitor are controlled by varying a value of an electrostatic capacitance of the first capacitor.

5. The plasma processing apparatus of claim 4, wherein the electrostatic capacitance of the first capacitor is set to prevent a parallel resonance between the first node and the second node from occurring.

6. The plasma processing apparatus of claim 1, wherein a second capacitor is electrically connected in series with the other coil of the inner coil and the outer coil between the first node and the second node.

7. The plasma processing apparatus of claim 6, wherein the second capacitor is a variable capacitor, and an amount of a current flowing in the coil electrically connected in series with the second capacitor are controlled by varying a value of an electrostatic capacitance of the second capacitor.

8. The plasma processing apparatus of claim 1, wherein the inner coil and the outer coil are coaxially arranged.

9. The plasma processing apparatus of claim 8, wherein the inner coil and the outer coil are concentrically arranged.

10. The plasma processing apparatus of claim 9, wherein the dielectric window is configured to serve as a ceiling of the processing chamber, and both the inner coil and the outer coil are arranged on the dielectric window.

11. A plasma processing apparatus, comprising:

a processing chamber having a dielectric window;

a substrate holding unit for holding thereon a processing target substrate within the processing chamber;

a processing gas supply unit configured to supply a processing gas into the processing chamber in order to perform a plasma process on the processing target substrate;

an RF antenna provided outside the dielectric window and configured to generate plasma of the processing gas within the processing chamber by inductive coupling; and a high frequency power supply unit configured to supply a high frequency power having a frequency for generating a high frequency electric discharge of the processing gas to the RF antenna, wherein the RF antenna includes an inner coil, an intermediate coil, and an outer coil with gaps therebetween in a radial direction, and the inner coil, the intermediate coil, and the outer coil are electrically connected in parallel with one another between a first node and a second node on high frequency transmission lines of the high frequency power supply unit, wherein the intermediate coil is coiled oppositely to both of the inner coil and the outer coil such that when traveling along each of the inner coil, the intermediate coil, and the outer coil from the first node to the second node via the high frequency transmission lines, a circumferential traveling direction along the intermediate coil from the first node to the second node is opposite to circumferential traveling directions along the inner coil and the outer coil from the first node to the second node, a first capacitor electrically connected in series with the intermediate coil is provided between the first node and the second node, and a direction of current flowing in the intermediate coil is identical to directions of current flowing in the inner coil and the outer coil in a circumferential direction.

12. The plasma processing apparatus of claim 11, wherein an amount of the current flowing in the intermediate coil is smaller than that of the current flowing in each of the inner coil and the outer coil.

13. The plasma processing apparatus of claim 11, wherein the first capacitor has an electrostatic capacitance having a value smaller than a value of an electrostatic capacitance obtained when a series resonance of the first capacitor and the intermediate coil occurs.

14. The plasma processing apparatus of claim 11, wherein combined impedance of the intermediate coil and the first capacitor has a negative reactance value.

15. The plasma processing apparatus of claim 11, wherein the first capacitor is a variable capacitor, and a direction and an amount of a current flowing in the intermediate coil are controlled by varying a value of an electrostatic capacitance of the first capacitor.

16. The plasma processing apparatus of claim 15, wherein the electrostatic capacitance of the first capacitor is set to prevent a parallel resonance between the first node and the second node from occurring.

17. The plasma processing apparatus of claim 11, wherein a second capacitor is electrically connected in series with the outer coil between the first node and the second node.

18. The plasma processing apparatus of claim 17, wherein the second capacitor is a variable capacitor, and a balance between currents flowing in the inner coil and the outer coil is controlled by varying a value of an electrostatic capacitance of the second capacitor.

19. The plasma processing apparatus of claim 11, wherein the inner coil, the intermediate coil, and the outer coil are coaxially arranged.

20. The plasma processing apparatus of claim 19, wherein the inner coil, the intermediate coil, and the outer coil are concentrically arranged.

21. The plasma processing apparatus of claim 20, wherein the dielectric window is configured to serve as a ceiling of the processing chamber, and the inner coil, the intermediate coil, and the outer coil are all arranged on the dielectric window.

22. The plasma processing apparatus of claim 11, wherein the outer coil is wound in a single turn in the circumferential direction.

23. The plasma processing apparatus of claim 11, wherein the intermediate coil is wound in a single turn in the circumferential direction.

* * * * *

UNITED STATES PATENT AND TRADEMARK OFFICE

CERTIFICATE OF CORRECTION

PATENT NO. : 9,119,282 B2
APPLICATION NO. : 13/410487
DATED : August 25, 2015
INVENTOR(S) : Yohei Yamazawa It is certified that error appears in the above-identified patent and that said Letters Patent is hereby corrected as shown below:

In the specification,

Column 15, line 36, please replace "$C_{83}$" with --$C_{88}$--

Signed and Sealed this
First Day of March, 2016

Michelle K. Lee
*Director of the United States Patent and Trademark Office*